United States Patent
Kikuchi et al.

(10) Patent No.: US 7,576,512 B2
(45) Date of Patent: Aug. 18, 2009

(54) SECONDARY BATTERY CHARGING SYSTEM CAPABLE OF PREVENTING DROP OF CHARGED ELECTRIC POWER

(75) Inventors: Tetsuro Kikuchi, Okazaki (JP); Hiroyuki Usami, Kariya (JP); Akira Kato, Kani (JP); Hisayoshi Oshima, Oobu (JP)

(73) Assignee: Denso Corporation, Kariya (JP)

( * ) Notice: Subject to any disclaimer, the term of this patent is extended or adjusted under 35 U.S.C. 154(b) by 395 days.

(21) Appl. No.: 11/332,391

(22) Filed: Jan. 17, 2006

(65) Prior Publication Data

US 2006/0170390 A1 Aug. 3, 2006

(30) Foreign Application Priority Data

Jan. 28, 2005 (JP) .............................. 2005-021117

(51) Int. Cl.
*H01M 6/50* (2006.01)
*H02J 7/00* (2006.01)
(52) U.S. Cl. .................... 320/100; 320/101; 429/12
(58) Field of Classification Search ................. 320/100, 320/101, 103; 429/12, 17, 19, 21
See application file for complete search history.

(56) References Cited

U.S. PATENT DOCUMENTS

| | | | | |
|---|---|---|---|---|
| 3,670,768 | A * | 6/1972 | Griswold | 137/606 |
| 4,530,034 | A * | 7/1985 | Kawarada | 362/9 |
| 5,808,448 | A * | 9/1998 | Naito | 322/13 |
| 6,727,011 | B2 | 4/2004 | Suzuki et al. | |
| 7,005,204 | B2 * | 2/2006 | Aoyagi et al. | 429/12 |
| 7,336,053 | B2 * | 2/2008 | Utsunomiya et al. | 320/103 |
| 2002/0162694 | A1 * | 11/2002 | Iwasaki | 180/65.3 |
| 2003/0168024 | A1 | 9/2003 | Qian et al. | |
| 2004/0018399 | A1 * | 1/2004 | Jung | 429/9 |
| 2004/0056633 | A1 * | 3/2004 | Sugiura et al. | 320/101 |
| 2004/0076860 | A1 * | 4/2004 | Aso | 429/23 |
| 2004/0257031 | A1 * | 12/2004 | Kang | 320/101 |
| 2005/0112417 | A1 | 5/2005 | Oshima et al. | |
| 2005/0118472 | A1 * | 6/2005 | Yang et al. | 429/23 |
| 2005/0162122 | A1 * | 7/2005 | Dunn et al. | 320/101 |
| 2005/0181246 | A1 * | 8/2005 | Nakaji | 429/13 |

(Continued)

FOREIGN PATENT DOCUMENTS

JP   S 59-114108   7/1984

(Continued)

*Primary Examiner*—Akm E Ullah
*Assistant Examiner*—Arun Williams
(74) *Attorney, Agent, or Firm*—Oliff & Berridge, PLC

(57) ABSTRACT

A secondary battery charging system, mounted on a vehicle having an internal combustion engine, has a secondary battery, a fuel cell, a fuel storage unit, and a fuel supply controller. In order to start the engine of the vehicle, the engine requires the electric power from the secondary battery. The fuel storage unit stores a fuel to be supplied to the fuel cell. When a given condition is satisfied, the fuel supply controller instructs the fuel storage unit to supply the fuel to the fuel cell in order to start the operation of the engine of the vehicle. The fuel cell thereby starts the generation of the electric power by performing electric chemical reaction and supplies the generated electric power to the secondary battery. The secondary battery supplies the electric power to the engine of the vehicle. The engine initiates its operation.

19 Claims, 12 Drawing Sheets

U.S. PATENT DOCUMENTS

| | | | |
|---|---|---|---|
| 2006/0099472 A1* | 5/2006 | Hsu | 429/27 |
| 2006/0138996 A1* | 6/2006 | Graham et al. | 320/101 |
| 2006/0166045 A1* | 7/2006 | Ryoichi | 429/9 |

FOREIGN PATENT DOCUMENTS

| JP | A 06-165309 | 6/1994 |
|---|---|---|
| JP | A 10-070843 | 3/1998 |
| JP | A 2001-231108 | 8/2001 |
| JP | A 2002-008694 | 1/2002 |
| JP | A 2002-209301 | 7/2002 |
| JP | A 2003-079008 | 3/2003 |
| JP | A 2003-184666 | 7/2003 |
| JP | A 2003-234108 | 8/2003 |
| JP | A 2003-297044 | 10/2003 |
| JP | A 2004-040868 | 2/2004 |
| JP | A 2004-168263 | 6/2004 |
| JP | A 2005-158335 | 6/2005 |

* cited by examiner

SECONDARY BATTERY CHARGING SYSTEM CAPABLE OF PREVENTING DROP OF CHARGED ELECTRIC POWER

CROSS-REFERENCE TO RELATED APPLICATIONS

This application is related to and claims priority from Japanese Patent Application No. 2005-21117 filed on Jan. 28, 2005, the contents of which are hereby incorporated by reference.

BACKGROUND OF THE INVENTION

1. Field of the Invention

The present invention relates to a secondary battery charging system for charging electrical energy in the necessity of initiating a start-up of an internal combustion engine mounted in a vehicle as a driving source power.

2. Description of the Related Art

Recently, a growing number of auxiliary apparatus or devices mounted on a vehicle and of functions thereof has increased the amount of current power consumption or a dark current while the vehicle is in idle or stops. This introduces a possibility of discharging a battery installed in a vehicle. In general, a built-in battery of a vehicle self-discharges while an engine of the vehicle is stopped and the amount of the charged electrical power is decreased gradually. A vehicle which does not run for a long time causes a remarkable voltage loss of the battery.

This phenomenon further decreases the capacity of the secondary battery because the balance between the charging and discharging is affected by the increase or change of electrical load of the vehicle during driving.

In general, the vehicle equipped with an internal combustion engine as a driving power source can start the internal combustion engine by an electrical power supplied from a battery. If an excess of discharging occurs in the battery, it becomes difficult to start the internal combustion engine. In order to avoid this phenomenon, there is a method to increase the capacity of the battery. However, this conventional manner introduces the limitation caused by increasing a weight and volume of the battery.

For example, various conventional techniques (1) to (4) have been disclosed in order to solve the above conventional drawbacks.

(1) Japanese laid open publication No. 2004-168263 has disclosed a manner to detect an excess discharging of a battery in advance, and to halt the supply of electrical power to various devices in which a dark current flows.

(2) Japanese laid open publication No. 2002-209301 has disclosed a manner to charge an electrical power of one battery to the other battery in a vehicle equipped with a plurality of batteries.

(3) Japanese laid open publication No. H10-070843 has disclosed an additional switching device for electrically interrupting the electrical path between a battery and auxiliary devices during the long stop of a vehicle engine for transportation thereof.

(4) Japanese laid open publication No. S59-114108 has disclosed a vehicle equipped with a solar cell, the electrical power generated in the solar cell can drive an air conditioner for cleaning the air in a compartment of the vehicle during stopping and also disclosed a configuration to charge residual electrical power of the solar cell into a battery such as a secondary battery.

However, the conventional technique (1) described above has still a drawback to discharge the electrical power accumulated in the battery at the stopping of the electrical power to the various devices. The conventional technique (2) above also has a drawback to limit the use of the feature only for a hybrid type vehicle (HV) driven by both electrical power and internal combustion engine. The conventional technique (3) has still a drawback to operate the switch to interrupt the electrical path for transportation by manual and a drawback to eliminate information stored in a memory during transportation. The conventional technique (4) also has a drawback of a difficulty to charge the battery when the vehicle is in a garage without sunshine.

Although it is possible to adopt another technique using a fuel cell system that has recently been available in which an electrical power is generated during the stop of a vehicle and a battery is charge by the generated electrical power, it still involves a drawback in that it has to get and keep hydrogen as a fuel for the fuel cell system.

SUMMARY OF THE INVENTION

The present invention has been made in consideration of those drawbacks of the prior art described above. An object of the present invention is to provide a secondary battery charging system capable of preventing a drop of the amount of electrical power charged in a secondary battery as a driving power source, and to be applicable to a start-up of an internal combustion engine mounted on a vehicle.

An aspect of the present invention is a secondary battery charging system mounted on a vehicle having a secondary battery, an electrical load, a fuel cell, a fuel storage unit, and a fuel supply controller. In the secondary battery charging system, the secondary battery is configured to supply an electrical energy for starting-up of an internal combustion engine as a driving power source of the vehicle. The electrical load is configured to receive the electrical energy from the secondary battery during the stop of the internal combustion engine. The fuel cell is configured to generate the electrical energy in an electrochemical reaction of combining a hydrogen and oxygen, and to supply the generated electrical energy to the secondary battery. The fuel storage unit is configured to store the fuel to be consumed for the electrochemical reaction in the fuel cell. The fuel supply controller is configured to control the supply of the fuel from the fuel storage unit to the fuel cell when a given condition is satisfied in order to initiate the generation of the electrical energy in the fuel cell.

BRIEF DESCRIPTION OF THE DRAWINGS

For a better understanding of the present invention and to show how the same may be carried out into effect, there will now be described by way of example only, specific embodiments and methods according to the present invention with reference to the according to the present invention.

DETAILED DESCRIPTION OF THE PREFERRED EMBODIMENTS

Figure 1:
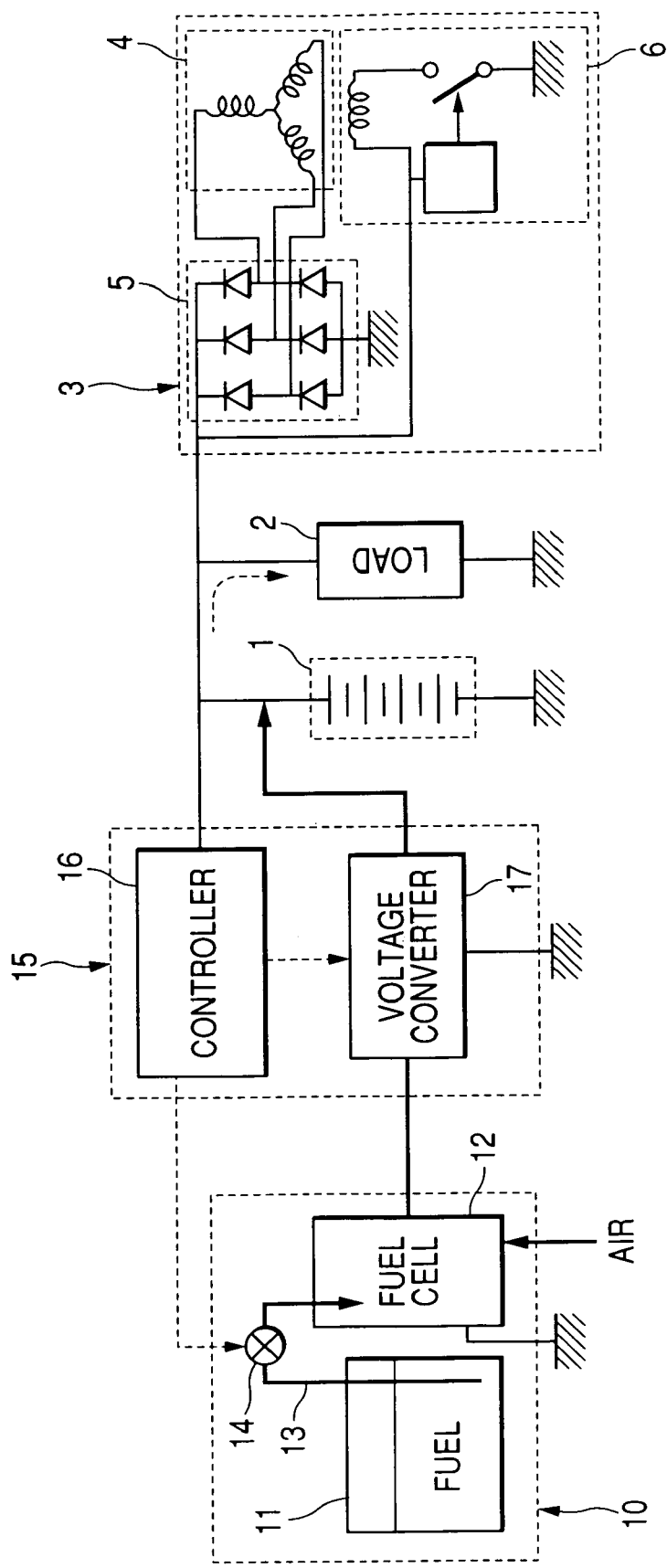
FIG. 1 is a schematic diagram showing an entire configuration of a secondary battery charging system of a first embodiment according to the present invention.

Hereinafter, various embodiments of the present invention will be described with reference to the accompanying drawings. In the following description of the various embodiments, like reference characters or numerals designate like or equivalent component parts throughout the several views.

First Embodiment

A description will now be given of a secondary battery charging system of the first embodiment according to the present invention with reference to FIG. 1 to FIG. 4.

FIG. 1 is a schematic diagram showing an entire configuration of the secondary battery charging system of the first embodiment.

The secondary battery charging system can be applied to a vehicle equipped with an internal combustion engine as a driving power source. The internal combustion engine (omitted from the drawings) is a gasoline engine or a diesel engine. In FIG. 1, the secondary battery 1 charges or accumulates an electrical power generated in an electrical power generator 3 during the operation of the internal combustion engine (omitted from the drawings). The secondary battery 1 further supplies the electrical power accumulated to devices built-in devices in the vehicle. The secondary battery 1 is so configured to supply the electrical power to a starter (not shown) for use in a start-up of the internal combustion engine.

An electrical load 2 consumes the electrical power all the time including the stopping of the vehicle. The electrical load 2 is built-in electric devices such as a timer and a remote controlled door lock switch, for example. The electrical power generated by the electrical power generator 3 is supplied to the electrical load 2 during the operation of the internal combustion engine, and the electrical power from the secondary battery 1 is supplied to the electrical load 2 during a stop of the internal combustion engine.

The electrical power generator 3 comprises an alternator 4, a rectifier 5, and a regulator 6. The alternator 4 (or AC dynamo) is driven by the internal combustion engine in order to generate the electrical power and outputs AC voltage as the electrical power generated. The rectifier 5 rectifies the AC voltage generated by the alternator 4 in order to generate a rectified voltage and supplies the rectified voltage as Direct Current (D.C.) voltage to the secondary battery 2 and the regulator 6. The regulator 6 controls the output of the alternator 4 so that the magnitude of the AC voltage provided from the alternator 4 becomes not more than predetermined voltage.

The secondary battery charging system is equipped with a fuel cell unit 10. The fuel cell unit 10 has a fuel storage unit 11 and a fuel cell 12. The fuel cell 12 installed in the secondary battery charging system of the first embodiment is a direct methanol fuel cell (DMFC) using methanol as a fuel. The fuel storage unit 11 accumulates liquid methanol. The fuel cell 12 is a solid polymer electrolyte (SPE) fuel cell or a polymer electrolyte fuel cell (PEFC). Because the SPE fuel cell can operate at normal temperature, it may be easily used even if a vehicle stops. Because the fuel cell unit 10 is a removable-type fuel cell unit, it is possible to replace the fuel cell unit 10 with a new one.

The fuel cell 12 generates an electrical power to be used for charging the secondary battery 1 during the stopping of the internal combustion engine (not shown). The magnitude of the electrical power generated by the fuel cell 12 is approximately 0.6 Watts, where an electromotive force of the secondary battery 1 is 12 Volts, and a current consumption of the electrical load 2 is approximately 50 mA. In the embodiment of the present invention, the fuel cell 12 generates the electrical power of approximately 10 Watts, for example, and charges the secondary battery 1 in order to recover the voltage of the secondary battery 1 rapidly.

Figure 2:
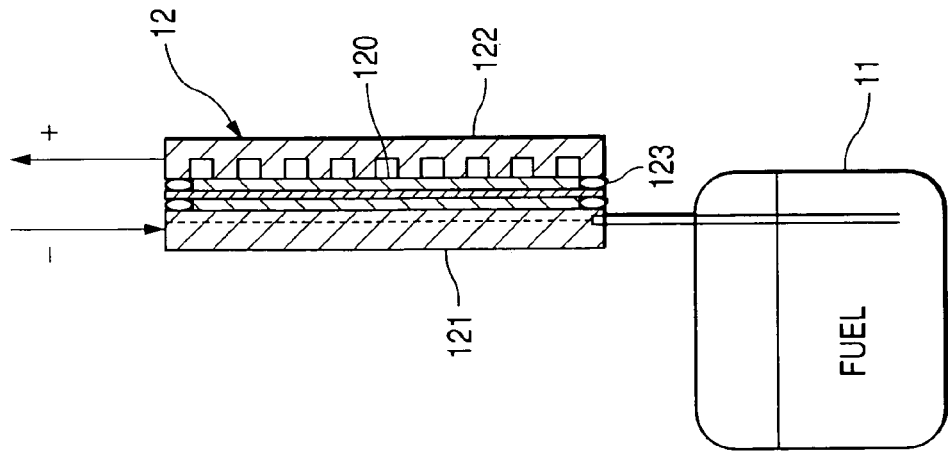
FIG. 2 is a schematic diagram showing a main configuration of a fuel cell installed in the secondary battery charging system of the first embodiment.

FIG. 2 is a schematic diagram showing a main configuration of the fuel cell 12 installed in the secondary battery charging system of the first embodiment.

The fuel cell 12 is a fuel cell composed of a membrane electrode assembly (MEA) 120 and a pair of separators 121 and 122. In the MEA 120, electrodes are formed at both sides of the membrane. In the fuel cell 12, a pair of separators 121 and 122 supports the MEA 120. The separator 121 is formed at an anode electrode side of the MEA 120. The separator 122 is formed at a cathode electrode side of the MEA 120.

The membrane is a proton conductive polymer electrolyte such as Nafion® of Dupont.

The fuel cell 12 mounted on the secondary battery charging system of the first embodiment is a single layer structure. The membrane in the MEA 120 is sealed with the sealing member 123.

A pair of the separators 121 and 122 is composed of a carbon or a conductive material of a plate shape. As shown in FIG. 2, a groove designated by a dotted line is formed in the separator 121 at the anode electrode side. Through the groove, methanol is supplied as fuel from the fuel storage unit 11. A groove (omitted from FIG. 2) is also formed in the separator 122 at the cathode electrode side, through which air is supplied to the membrane.

Because the fuel cell 12 generates the electrical power of only 10 Watts, it is not necessary to supply air to the membrane, that is, air is automatically supplied in natural circulation of air to the cathode separator 122 side.

Reverting to FIG. 1, a fuel supply passage 13 is formed between the fuel storage unit 11 and the fuel cell 12. Through the fuel supply passage 13 methanol stored in the fuel storage unit 11 is supplied to the fuel cell 12. A valve 14 is mounted on the fuel supply passage 13 in order to open and close the passage. During the usual operation, the valve 14 closes the fuel supply passage 13.

The valve 14 opens at the initiation time of electrical power generation in the fuel cell 12. The methanol of a high pressure stored in the fuel storage unit 11 is supplied to the fuel cell 12. The electrical power generation is initiated by the supplied methanol with oxygen in air that acts as catalyst.

Figure 3:
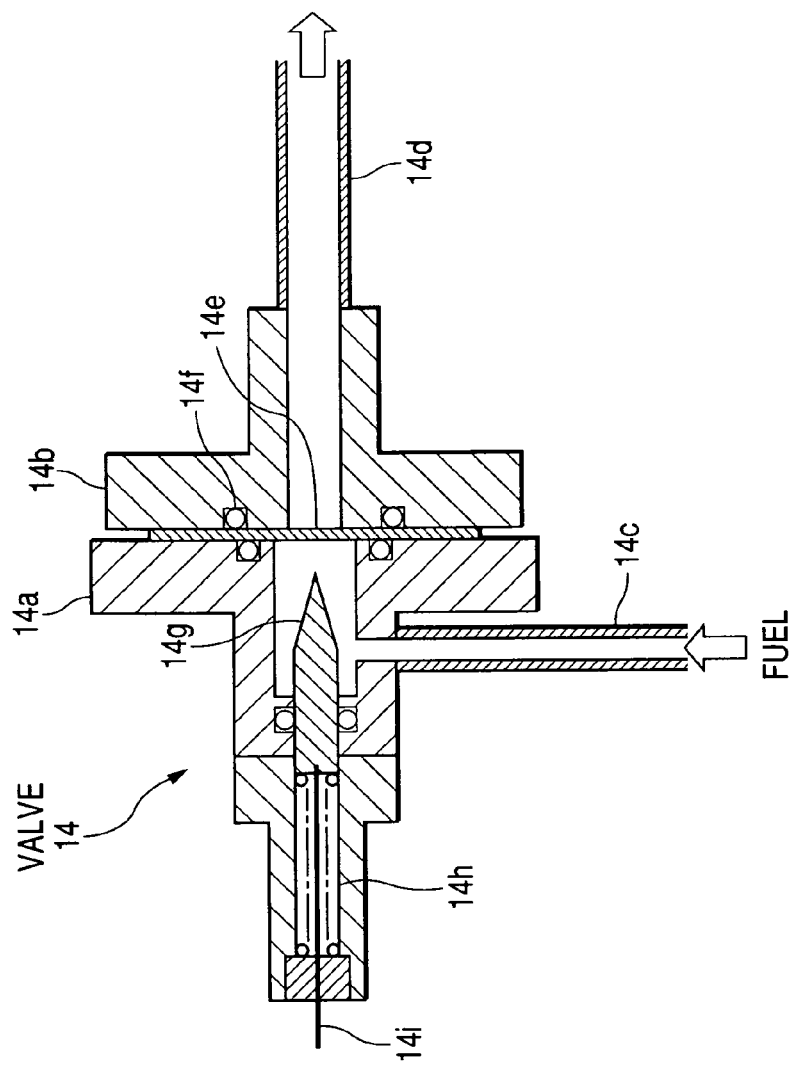
FIG. 3 is a sectional diagram showing a configuration of a valve in a fuel cell unit in the secondary battery charging system of the first embodiment.

FIG. 3 is a sectional diagram showing a configuration of the valve 14 equipped with the fuel cell unit 10 in the secondary battery charging system of the first embodiment. The valve 14 keeps its opening state when it opens once, in other words, the valve 14 is available for one use. The valve 14 is so configured to operate when receiving the electrical supply from the secondary battery 1.

As shown in FIG. 3, the valve 14 has a first casing 14a and a second casing 14b. The first casing 14a is equipped with an introduction passage 14c through which the methanol is supplied from the fuel storage unit 11. The second casing 14b is equipped with an exhaust passage 14d through which the methanol is emitted.

An interrupting member 14e is placed between the first casing 14a and the second casing 14b. The interrupting member 14e interrupts the introduction passage 14c from the exhaust passage 14d. The interrupting member 14e is made of aluminum foil.

The valve 14 has a shiftable needle 14g in both directions, right and left directions. The needle 14g shifts from a first position to a second position. At the first position the tip of the needle 14g contacts the interrupting member 14e. In the second position the tip of the needle 14e is apart from and is not contact to the interrupting member 14e.

The valve 14 is equipped with an elastic member such as a coil spring 14h by which the needle 14g is forcedly moved and pushed to the interrupting member 14e in the right direction (see the right direction shown in FIG.2).

During the normal state, the needle 14g is fixed by the heating wire 14i in advance where the coil spring 14h is fallen in a compressed state. An elastic member of the present invention means the coil spring 14h of the first embodiment.

When receiving a start-up signal transferred form a controller 16 (will be described in detail later), the heating wire 14i is heated to its melting point. The coil spring 14h thereby forces the needle 14g toward the right direction in FIG. 2, so that the needle 14g pushes and breaks the interrupting member 14e. Thus, it can be realized to have and provide the valve 14 with a simple configuration, and the start-up signal to be transferred to the heating wire 14i can realize the transition of the interrupt state to the opening state of the interrupting member 14e.

Reverting to FIG. 1 again, the secondary battery charging system of the first embodiment is equipped with a controller 15. The controller 15 comprises a control circuit 16 and a voltage conversion circuit 17. Each circuit 16 and 17 is configured to operate by the supply of electrical power form the secondary battery 1. The control circuit 16 is realized by an available or commercial microcomputer comprising a central processing unit (CPU), a read only memory (ROM), a random access memory (RAM), and input/output circuit (I/O). The control circuit 16 executes each calculation according to programs stored in the ROM.

The control circuit 16 detects the operating state of the internal combustion engine and controls the valve 14 for its opening/closing operation. The control circuit 16 and the valve 14 form a fuel supply means and a fuel supply controller according to the present invention. The voltage conversion circuit 17 of the first embodiment means a voltage conversion means of the present invention.

The voltage conversion circuit 17 boosts the electrical energy, namely the level of the voltage generated in the fuel cell 12 to a voltage level at which the secondary battery 1 can charge the electrical power.

In the first embodiment, because a level of the voltage generated by the fuel cell 12 composed of the single fuel cell is approximately 0.5 to 0.8 volts, the voltage conversion circuit 17 boosts the electrical power generated of the secondary voltage 1.

Figure 4:
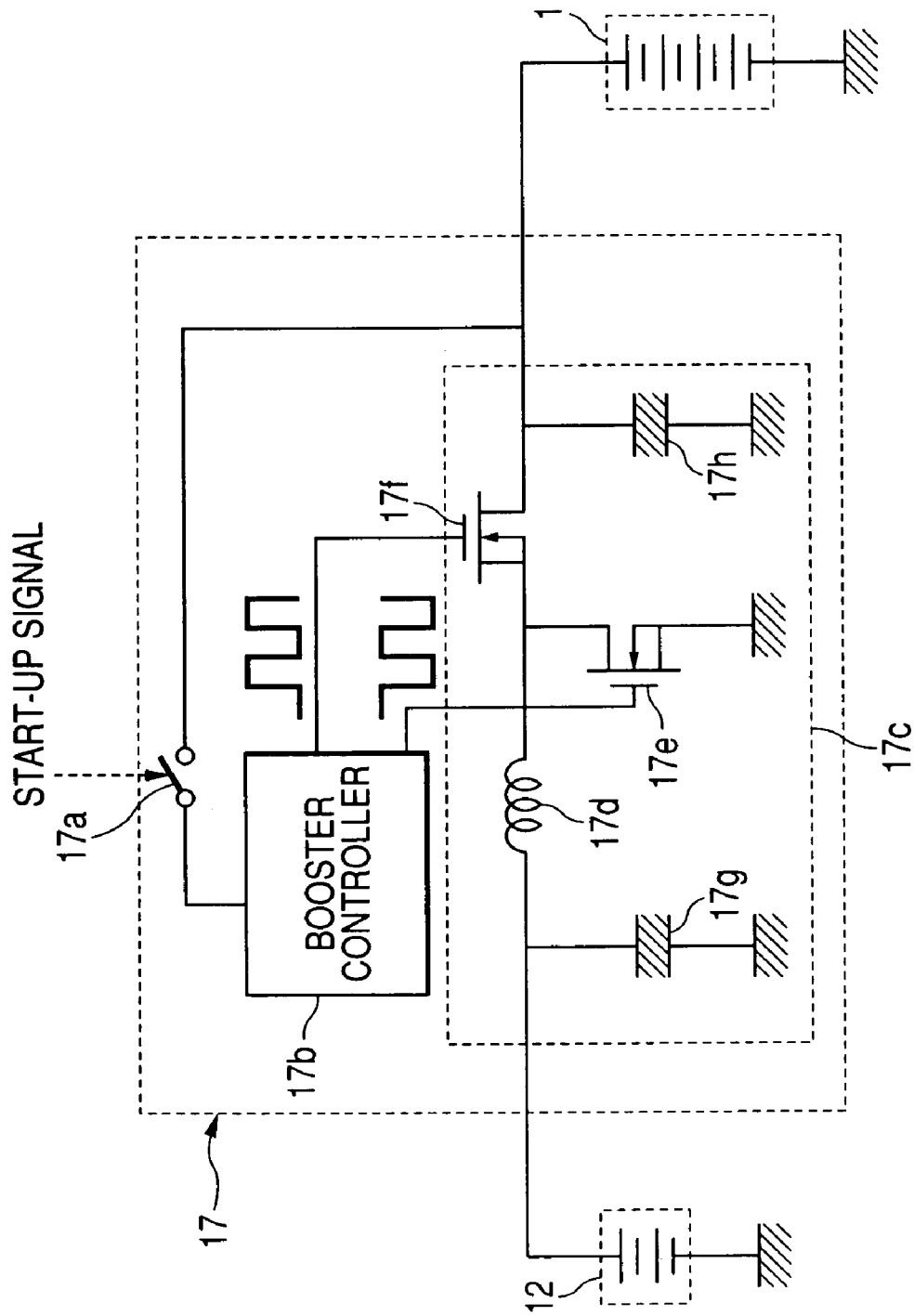
FIG. 4 is a circuit diagram of a voltage converter in the secondary battery charging system of the first embodiment.

FIG. 4 is a circuit diagram of the voltage conversion circuit 17 in the secondary battery charging system of the first embodiment. As shown in FIG. 4, the voltage conversion circuit 17 is a well known booster comprising comprises a switch 17a, a boost controller 17b, and a DC/DC converter 17c. The switch 17a performs open and close operation according to the start-up signal transferred from the control circuit 16. The DC/DC converter 17c comprises a coil 17d, switching elements 17e and 17f such as field effect transistors (FET), and capacitances 17g and 17h.

The switching elements 17e and 17f are capable of performing ON and OFF operation by using the electrical energy accumulated in the coil 17d having a desired inductance. The capacitances 17g and 17h are capable of smoothing the voltage.

Next, a description will be given of the operation of the secondary battery charging system according to the first embodiment.

The control circuit 16 of the first embodiment outputs or transfers to the valve 14 a start-up signal as a control signal at a desired elapsed time counted from the time to start the stopping of the internal combustion engine (omitted from the drawings). The desired elapsed time counted is the time when the electrical energy (or capacities) charged in the secondary battery 1 becomes lower than a desired level to start the internal combustion engine. For example, the desired level is 40 percentages of the full charged state in the secondary battery.

The stop of the generation of the electrical power in the alternator 4 informs the stopping of the internal combustion engine. The stopping state of the internal combustion engine can be detected as the stopping state of the alternator 4.

The valve 14 opens the fuel supply passage 13 when receiving the start-up signal as a control signal transferred from the control circuit 16. The methanol accumulated in the fuel storage unit 11 is supplied to the fuel cell 12. The fuel cell 12 thereby initiates the generation of the electrical energy.

In the configuration of the first embodiment, all of methanol stored in the fuel storage unit 11 is supplied to the fuel cell 12 until the fuel storage unit 11 becomes empty.

The voltage converter circuit 17 boosts the electrical energy generated in the fuel cell 12 and then supplies the boosted voltage to the secondary battery 1.

As described above, according to the first embodiment, it is possible to prevent any voltage drop or the capacity drop in the secondary battery 1 during the stopping of the internal combustion engine (omitted from the drawings) by charging the secondary battery 1 based on the above described manner. This provides the ability to provide the necessary electrical power for the start-up of the internal combustion engine.

Second Embodiment

A description will now be given of a secondary battery charging system according to the second embodiment.

When compared with the configuration of the first embodiment, the secondary battery charging system of the second embodiment takes a different start-up condition to the fuel cell 12.

A description will be given of the difference between the first and second embodiments.

The control circuit 16 of the secondary battery estimates the state of charge (SOC) in the secondary battery 1 by detecting the open voltage of the secondary battery 1.

The control circuit 16 outputs the start-up signal as a control signal to the valve 14 when the SOC estimated from the open voltage of the secondary battery 1 is lower than a predetermined level.

The predetermined level is a charged capacitance to be required for performing the start-up of the internal combustion engine, is approximately forty percentages of the full charged voltage of the secondary battery 2, for example. Other components of the secondary battery charging system of the second embodiment are the same of those of the first embodiment. Therefore the explanation for those is omitted here.

As described above, according to the configuration of the secondary battery charging system of the second embodiment, it is possible to have the same effect of the first embodiment.

Third Embodiment

A description will now be given of the secondary battery charging system according to the third embodiment of the present invention with reference to FIG. 5 and FIG. 6.

When compared with the configuration of the first embodiment, the secondary battery charging system of the third embodiment has a different start-up condition and a valve 614 with a different configuration.

Other components of the secondary battery charging system of the third embodiment are the same of those of the first embodiment. Therefore the explanation for those same components is omitted here.

Figure 5:
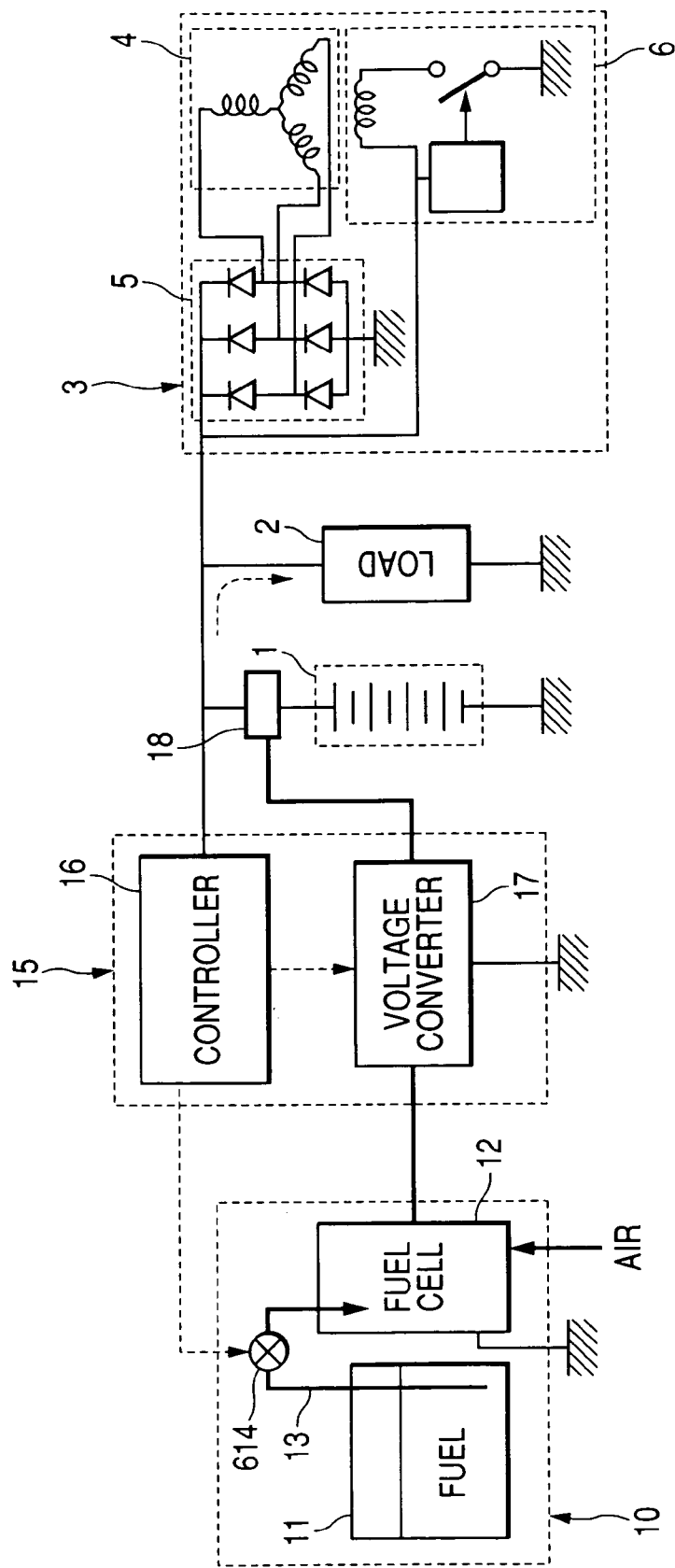
FIG. 5 is a schematic diagram showing an entire configuration of a secondary battery charging system of a third embodiment according to the present invention.

FIG. 5 is a schematic diagram showing an entire configuration of the secondary battery charging system of the third embodiment according to the present invention.

Figure 6:
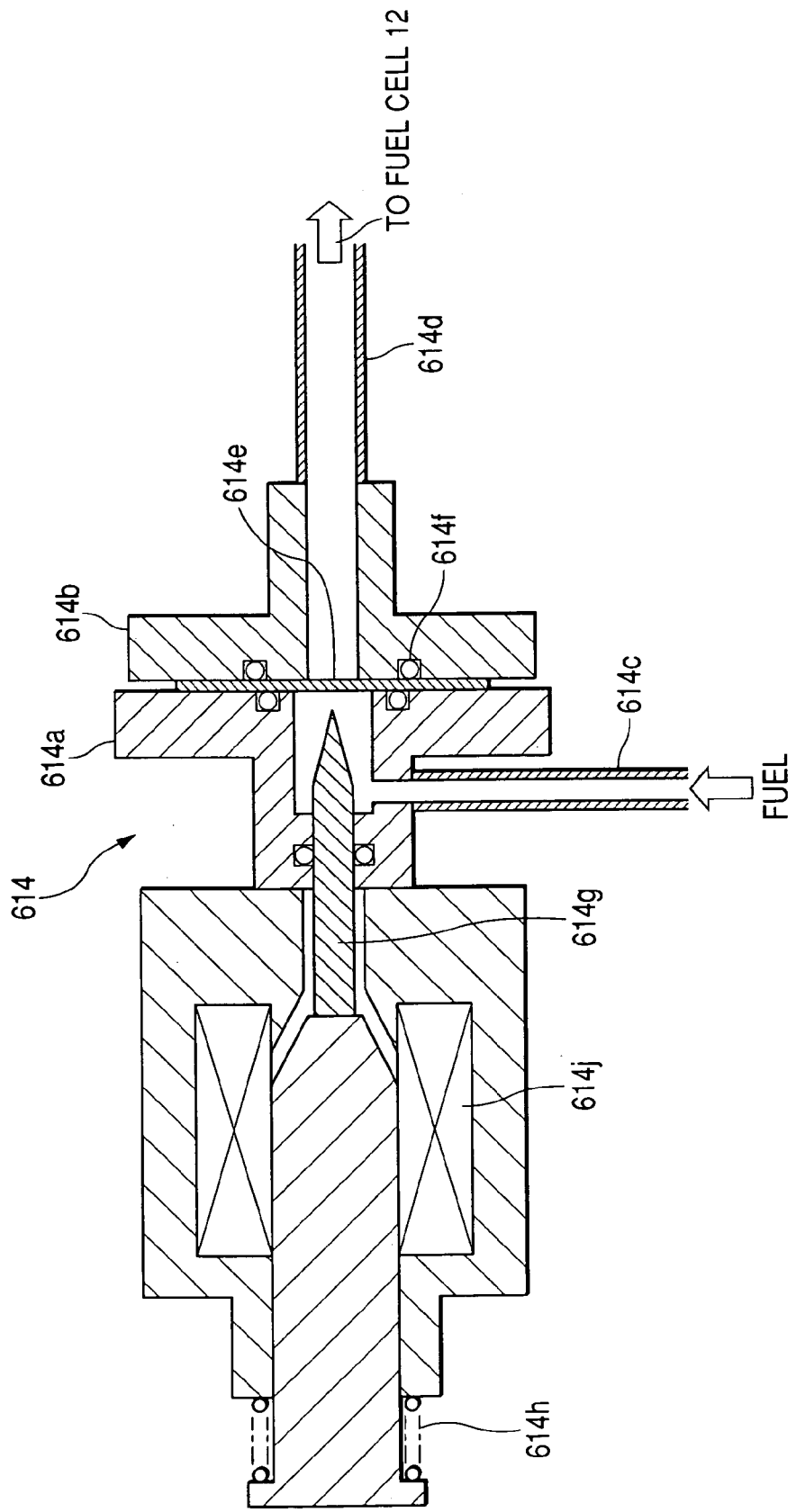
FIG. 6 is a sectional diagram showing a configuration of a valve installed in the fuel cell unit in the secondary battery charging system of the third embodiment.

FIG. 6 is a sectional diagram showing a configuration of the valve 614 installed in the fuel cell unit in the secondary battery charging system of the third embodiment.

The secondary battery charging system of the third embodiment is equipped with a current sensor 18 for monitoring the current state of the secondary battery 1. The current sensor 18 is capable of detecting a current direction and a magnitude of the current in the secondary battery 1.

As shown in FIG. 6, the valve 614 of the third embodiment is equipped with a solenoid 614j by which the needle 614g is shifted in right direction. The coil spring 614h accumulates its spring force capable of shifting the tip of the needle 614g apart from the interrupt member 614e toward the left direction in FIG. 6. When the electrical power is supplied to the solenoid 614j, the power of the solenoid 614j pushes the needle 614g in the right direction shown in FIG. 6 and thereby the tip of the needle 614g breaks the interrupt member 614e. As a result, the introduction passage 614c is joined with the exhaust passage 614d so as to supply the methanol from the fuel storage unit 11 to the fuel cell 12 through both the passages 614c and 614d.

When detecting the state of stopping the internal combustion engine (not shown) through the current sensor 18, the control circuit 15 outputs the start-up signal to the valve 614 immediately.

In the valve 614, the electrical power is thereby supplied to the solenoid 614j and the supply of the methanol to the fuel cell 12 is initiated. When receiving the methanol, the fuel cell 12 initiates the generation of electrical power, and the electrical power generated is charged to the secondary battery 1. The current sensor 18 monitors the state of the current flow in the secondary battery 1 whether the current of the secondary battery 1 is zero or not in order to avoid an over discharging of the secondary battery 1.

The third embodiment has the configuration to change the secondary battery 1 immediately following the stop of the internal combustion engine (omitted from the drawings). Accordingly, because it is necessary to fill only the amount of the electrical power consumed in the secondary battery 1, the generation ability of the fuel cell 12 can be set to the lowest level, but it is required for the fuel cell 12 to have a long life time.

Because the alternator 4 can initiate the generation of the electrical power even if the internal combustion engine initiates the operation, it is possible to have a configuration that the fuel cell 12 stops its generation of the electrical power. In this case, the valve 614 has a different configuration to operate more than one time in order to supply the methanol to the fuel cell 12 repeatedly.

Figure 7:
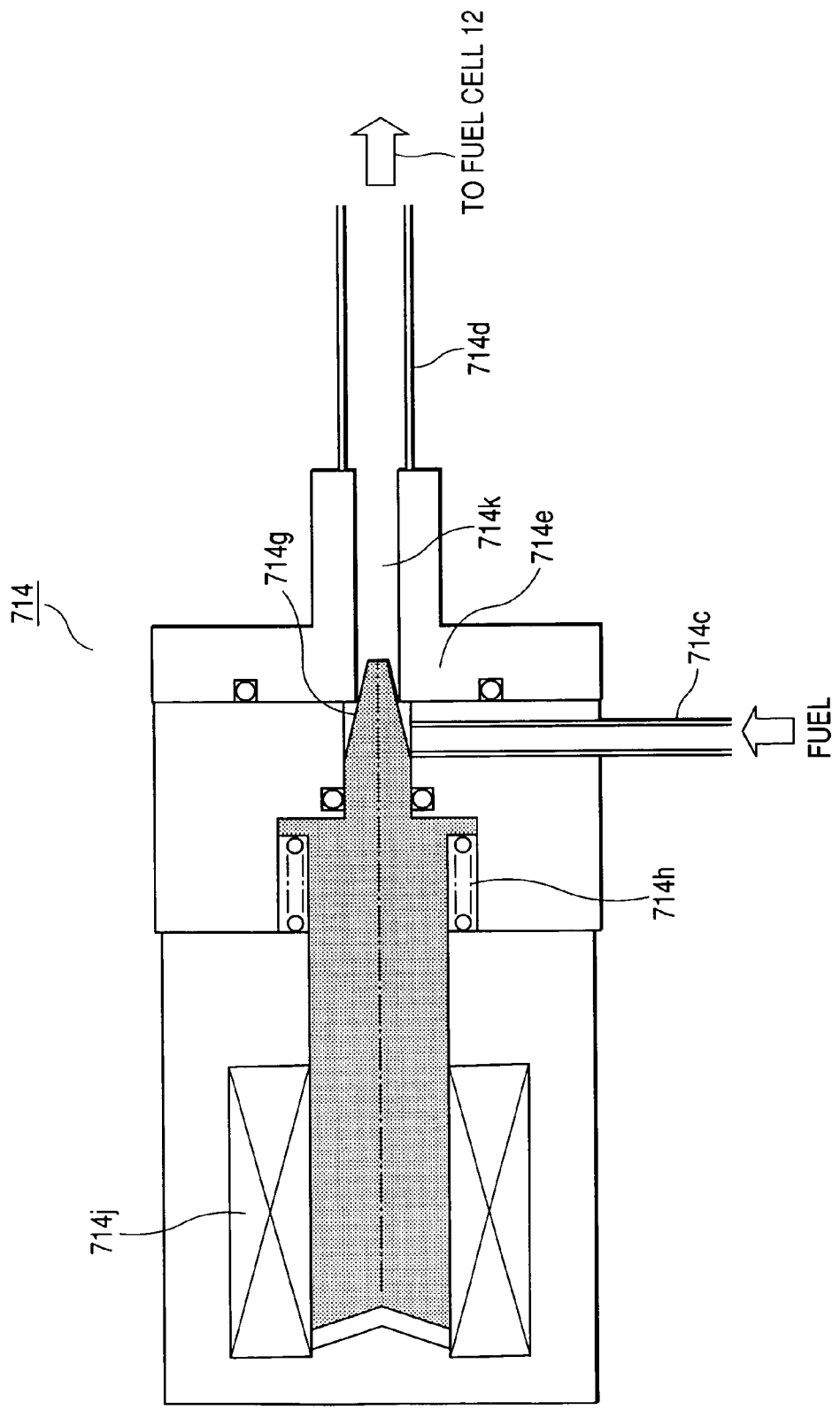
FIG. 7 is a sectional diagram showing another configuration of the valve installed in the fuel cell unit in the secondary battery charging system of the third embodiment.

FIG. 7 is a sectional diagram showing another configuration of the valve installed in the fuel cell unit in the secondary battery charging system of the third embodiment. The valve 714 of another configuration shown in FIG. 7 will be called as the repeatable valve.

The repeatable valve 714 has a configuration shown in FIG. 7 in which the tip of a shiftable needle 714g is shifted toward the right direction in FIG. 7 by a coil spring 714h and thereby contacted with a pedestal 714e having a penetrate hole 714k. Through the penetrate hole 714k the fuel such as methanol flows from an introduction passage 714c to an exhaust passage 714d. When the tip of the needle 714g is pushed to the penetrate hole 714k of the pedestal 714e by the spring power of the coil spring 714h while no electric power is supplied to the solenoid 714j, the tip of the needle 714g seals the penetrate hole 714k so that the exhaust passage 714d is interrupted from the introduction passage 714c.

When the electric power is supplied to the solenoid 714j, the needle 714g is shifted by the solenoid 714j toward the left direction in FIG. 7 so as to join the introduction passage 714c with the exhaust passage 741d, so that the methanol is supplied to the fuel cell 12 through the introduction and exhaust passages 714c and 714d.

Thus, when the electrical power is not supplied to the solenoid 714j, the tip of the needle 714g is contacted with the pedestal 714e by the coil spring 714h in order to seal the exhaust passage 714d from the introduction passage 714c.

Further, when the electrical power is supplied to the solenoid 714j, the tip of the needle 714g is released from the pedestal 714e in order to supply the methanol from the fuel storage unit to the fuel cell through the introduction passage 714c, the penetrate hole, and the exhaust passage 714d.

As described above, according to the configuration of the secondary battery charging system of the third embodiment, it is possible to use the repeatable valve 714 repeatedly. Other components of the secondary battery charging system of the third embodiment are the same of those of the first embodiment. Therefore the explanation for those is omitted here.

Fourth Embodiment

A description will now be given of the secondary battery charging system according to the fourth embodiment with reference to FIG. 8.

Figure 8:
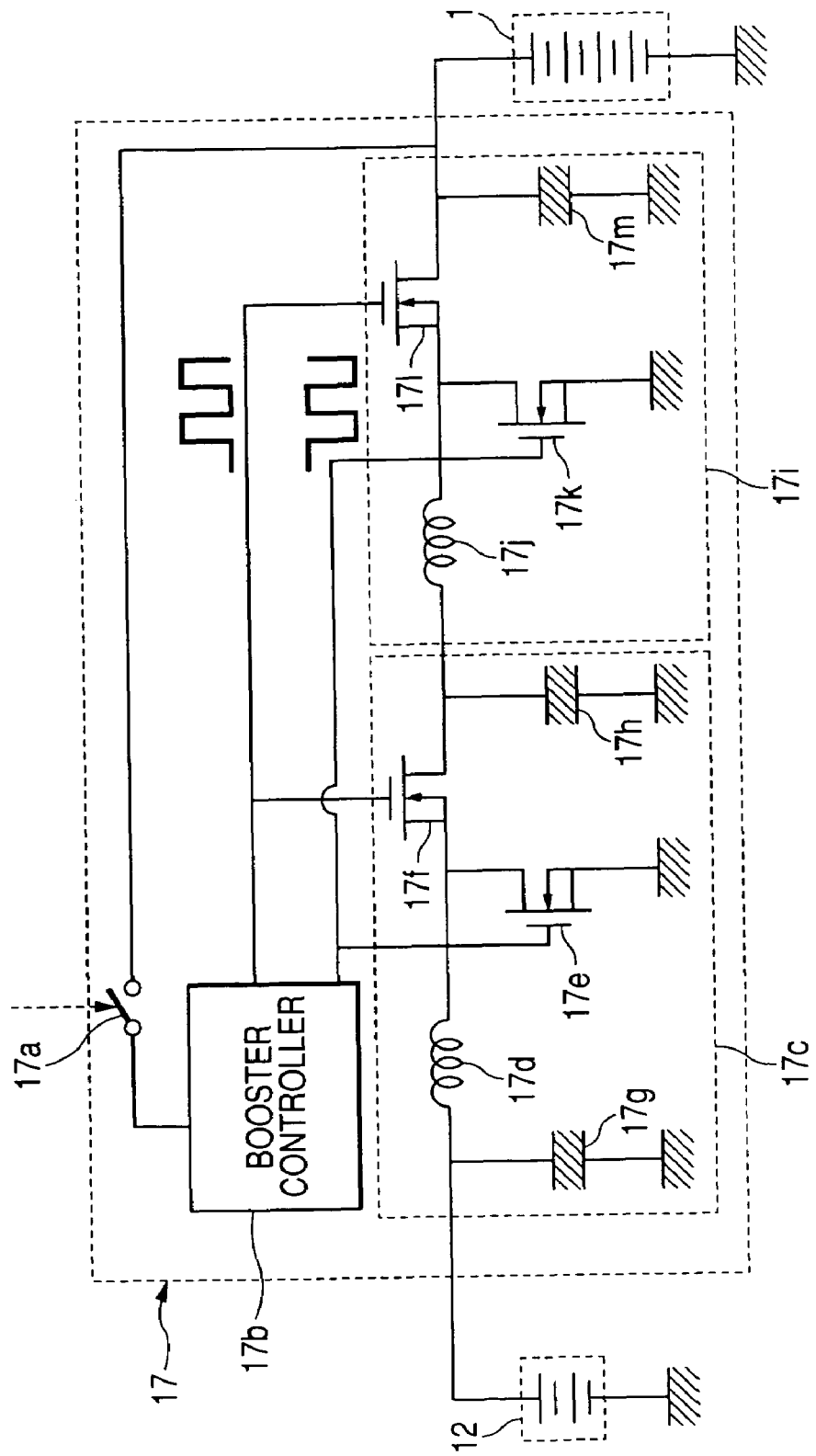
FIG. 8 is a schematic diagram showing a configuration of a secondary battery charging system of a fourth embodiment according to the present invention.

FIG. 8 is a schematic diagram showing a configuration of voltage conversion circuits 17 in the secondary battery charging system of the fourth embodiment.

The secondary battery charging system of the fourth embodiment has the voltage conversion circuit having a different configuration when compared with that of the first embodiment. Other components of the secondary battery charging system of the fourth embodiment are the same of those of the first embodiment. Therefore the explanation for those is omitted here. For this reason, FIG. 8 shows the configuration of only the voltage conversion circuit and does not show other components.

A plurality of the voltage conversion circuits are installed in the secondary battery charging system of the fourth embodiment. FIG. 8 shows a pair of the DC/DC converters 17c and 17i and each converter corresponds to the booster circuit of the present invention.

When the voltage of the fuel cell 12 is approximately 0.6 volts for example, the DC/DC converter 17c boosts the voltage 0.6 volts to approximately 3.0 volts, and the DC/DC converter 17i further boosts the voltage 3.0 volts to approximately 12.0 volts.

Thus, according to the secondary battery charging system of the fourth embodiment, the incorporation of a plurality of the DC/DC converters (or boosters) can improve the efficiency of the energy conversion.

Fifth Embodiment

A description will now be given of the secondary battery charging system according to the fifth embodiment with reference to FIG. 9.

Figure 9:
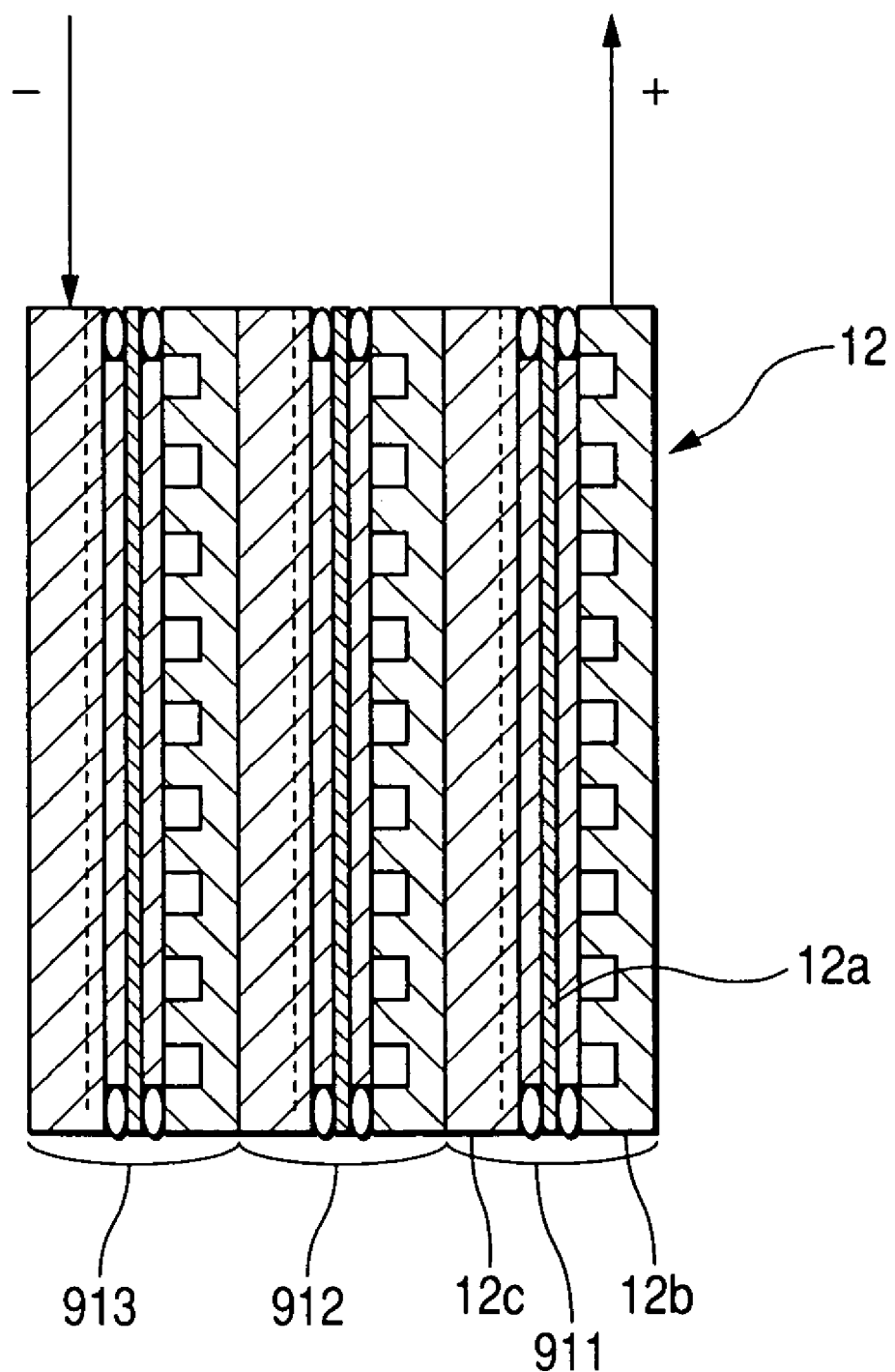
FIG. 9 is a schematic diagram showing a fuel cell installed in a secondary battery charging system of the fifth embodiment.

FIG. 9 is a schematic diagram showing a fuel cell installed in the secondary battery charging system of the fifth embodiment. Other components of the secondary battery charging system of the fifth embodiment are the same of those of the first embodiment. Therefore the explanation for those is omitted here.

FIG. 9 shows the fuel cell composed of three fuel cell elements connected in series. Each fuel cell element has the same configuration of the fuel cell shown in FIG. 2.

According to the secondary battery charging system of the fifth embodiment, the three fuel cell elements 911, 912, and 913 are laminated and each of fuel cell elements 911, 912, 913 comprises a MEA 12a and a pair of the separators 12b and 12c. This configuration of a plurality of the fuel cell elements 911, 912, and 913 connected in series can increase the output voltage of the fuel cell 12.

Sixth Embodiment

A description will now be given of the secondary battery charging system according to the sixth embodiment with reference to FIG. 10.

Figure 10:
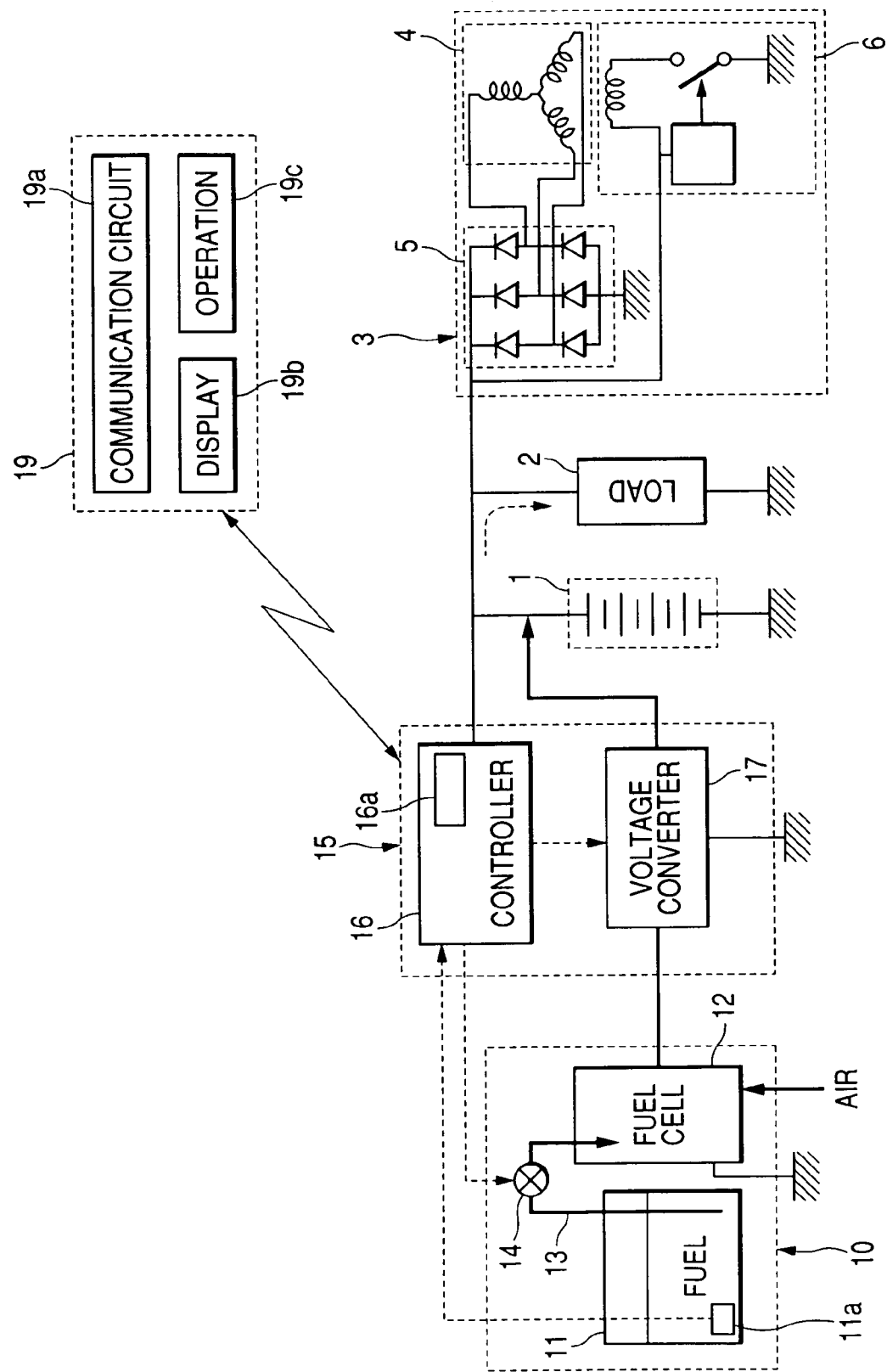
FIG. 10 is a schematic diagram showing an entire configuration of a secondary battery charging system of a sixth embodiment according to the present invention.

FIG. 10 is a schematic diagram showing an entire configuration of the secondary battery charging system of the sixth embodiment. As shown in FIG. 10, a remote control device 19 is provided at the outside of a vehicle equipped with the secondary battery charging system. The control circuit 16 is equipped with a communication circuit 16a as a first communication means through which a radio communication is performed between the remote control device 19 and the secondary battery charging system. The sixth embodiment, the radio communication is performed between the vehicle incorporated with the secondary battery charging system and a user can use the remote control device 19.

The control circuit 16 detects the residual electrical energy of the secondary battery 1 at a desired elapsed time counted from the fallen time into the stop of the internal combustion engine installed in the vehicle. When the detection result indicates that the residual electrical energy is lower than the desired least level that is necessary to start the internal combustion engine, the control circuit 16 transmits information regarding the residual electrical energy in the secondary battery 1 to the remote control device 19.

The control circuit 16 receives the control signal such as a start-up control signal for the fuel cell 12 transferred from the remote control device 19.

The remote control device 19 comprises a display section 19b and an operation section 19c. The user watches the information displayed on the display section 19b and operates an instruction to the secondary battery charging system by the operation section 19c.

The remote control device 19, the communication circuit 19a, the display section 19b, and the operation section 19c mean the second communication means, the display means, and the operation means according to the present invention.

When receiving the information regarding the residual amount of the electrical energy accumulated or stored in the secondary battery 1 transferred from the fuel control circuit 16, the remote control device 19 displays on the display section 19b (as a monitor) the information that indicates the necessity of charging the electrical energy into the secondary battery 1. The user watches the information displayed on the display section 19b and instructs to initiate the charging of the secondary battery 1, and transfers the start-up control signal to the secondary battery charging system through the remote control device 19. That is, the remote control device 19 transmits the start-up control signal to the control circuit 16 in order to initiate the charging operation in the fuel cell 12.

When receiving the start-up control signal transferred from the remote control device 19, the control device 16 instructs to the fuel cell 12 the initiation of the generation of the electrical energy in order to charge the secondary battery 1.

As shown in FIG. 10, the fuel storage unit 11 is equipped with a fuel remaining sensor 11a as a fuel remaining amount detection means.

The sensed signal generated by the fuel remaining sensor 11a is transferred to the fuel control circuit 16. When receiving the sensed signal from the fuel remaining sensor 11a and the sensed signal informs that the amount of methanol as fuel in the fuel storage unit 11 is empty, the control circuit 16 transmits to the remote control device 19 the information regarding the empty state of methanol in the fuel storage unit 11.

When receiving the information regarding the empty state of methanol, the remote control device 19 displays the information, and the user watches and knows, displayed on the information, that the amount of methanol in the fuel storage unit becomes empty.

As described above in detail, according to the configuration of the secondary battery charging system of the sixth embodiment, it is possible to inform the necessity of the charging to the secondary battery 1 to the user which is out of the vehicle, and possible to charge the secondary battery 1 based on the user's instruction.

Although the remote control device 19 is a device out of the vehicle, the present invention is not limited by this configuration, for example, it is possible to install the remote control device 19 in the compartment of the vehicle. This configuration allows connecting the control device 19 with the control circuit 16 through a wire.

Other components of the secondary battery charging system of the third embodiment are the same of those of the first embodiment. Therefore the explanation for those is omitted here.

Seventh Embodiment

A description will now be given of the secondary battery charging system according to the seventh embodiment with reference to FIG. 11.

Figure 11:
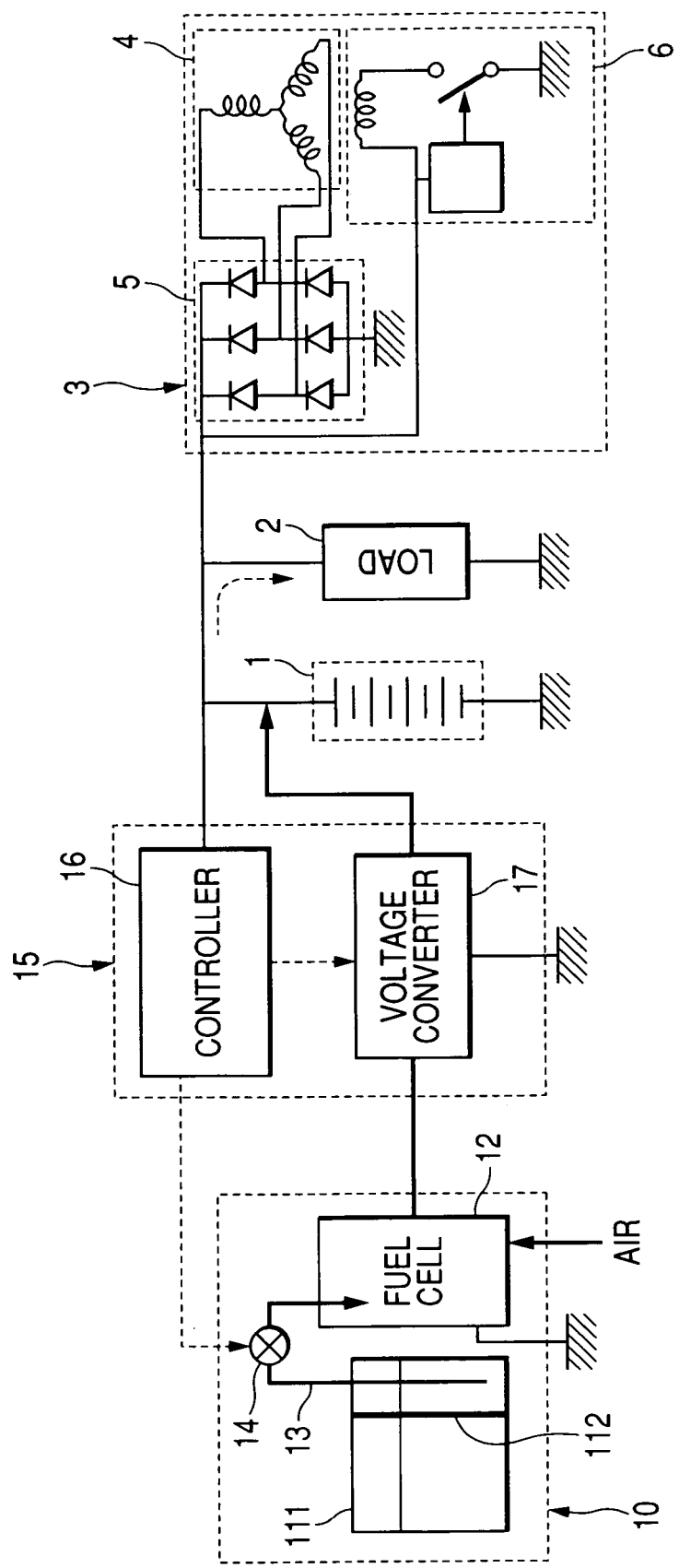
FIG. 11 is a schematic diagram showing a configuration of a secondary battery charging system of a seventh embodiment according to the present invention.

FIG. 11 is a schematic diagram showing a configuration of the secondary battery charging system of the seventh embodiment. When compared with the configuration of the first embodiment, instead of the fuel storage unit 111 of the first embodiment, the secondary battery charging system of the seventh embodiment uses a windshield washer tank which contains windshield washer fluid as the fuel. The windshield washer fluid is a commercially available one containing methanol as a liquid organic compound. In general, windshield washer liquid contains water, surfactant, colorant and the like in addition to methanol. Further, it is possible to use as windshield washer liquid alcohol such as ethanol and also possible to use ether such as dimethyl ether.

The fuel storage unit 111 is equipped with a membrane unit 112 for extracting only the methanol component from the windshield washer liquid. The membrane unit 112 extracts only the methanol component or a combination of methanol and water components from the windshield washer liquid.

It is possible to use porous zeolite film, porous silica film, or porous organic film as the membrane.

As describe above, according to the seventh embodiment, the fuel for the fuel cell 12 is obtained from the windshield washer liquid, so it is not necessary to prepare the fuel for the fuel cell 12 and not necessary to prepare the fuel storage unit 11.

Eighth Embodiment

A description will now be given of the secondary battery charging system according to the eighth embodiment with reference to FIGS. 12A, 12B, and 12C.

Figure 12A:
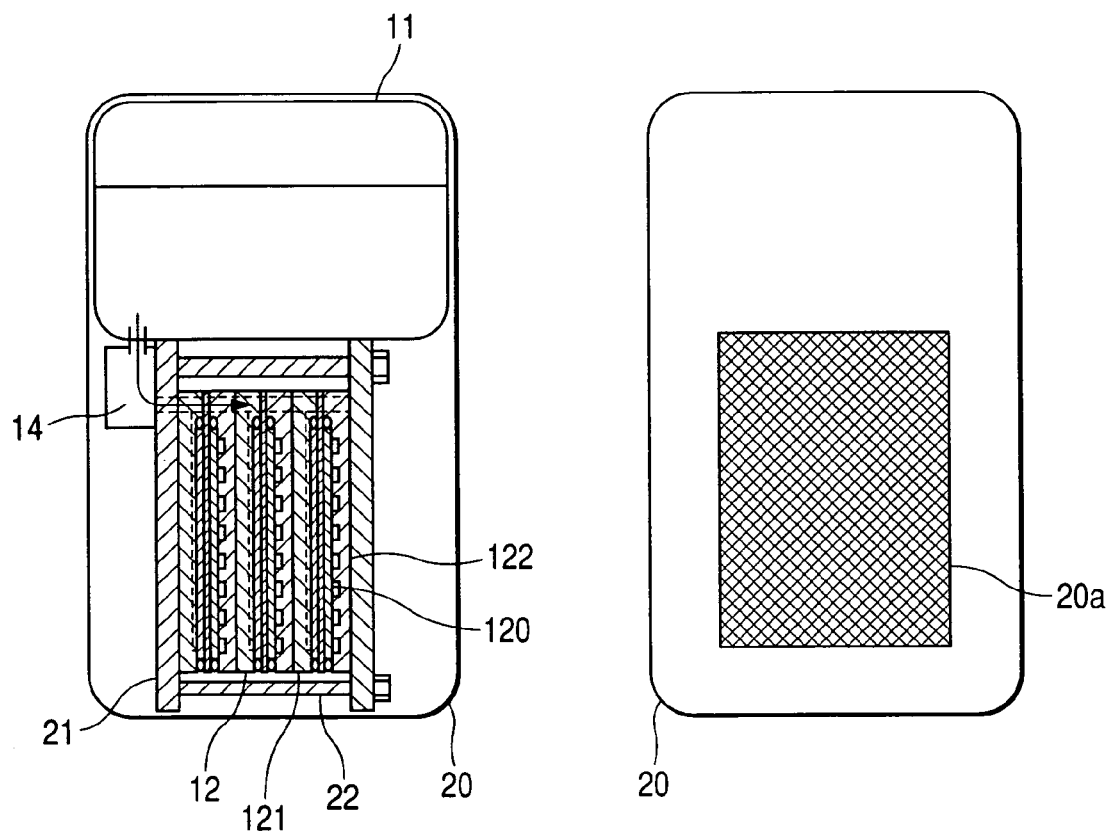
FIGS. 12A, 12B, and 12C are schematic diagrams showing a configuration of a fuel cell unit installed in a secondary battery charging system of an eighth embodiment according to the present invention.

FIG. 12A is a schematic diagram showing a configuration of a fuel cell unit 10 contained in a case 20 in the secondary battery charging system of the eighth embodiment. FIG. 12B shows an outside view of the case 20. FIG. 12C shows a configuration of a separator at anode electrode side of the fuel cell.

As shown in FIG. 12A, the fuel cell unit 10 is formed with a single body. In the eighth embodiment, the fuel cell 12 is formed in a three-layer laminate configuration of three fuel cells. Both the sides of the fuel cells laminated are sandwiched by flanges 21 and fixed with bolts 22

The fuel storage unit 11 is placed at the upper side of the fuel cell 12. The valve 14 is placed at the upper side of the fuel cell 12 and the bottom side of the fuel storage unit 11. The fuel storage unit 11, the fuel cell 12, and the valve 14 are contained in the single case 20.

Figure 12B:
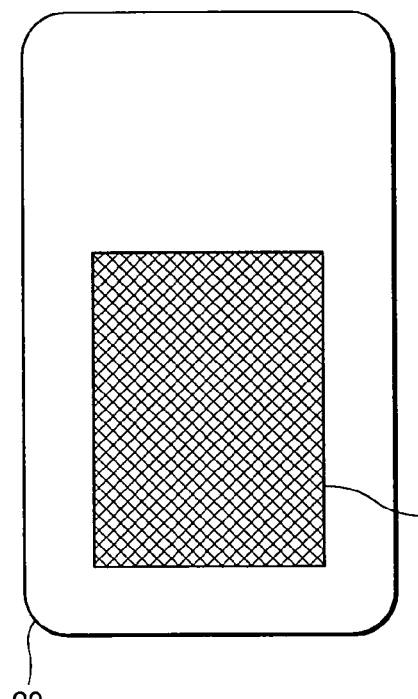

As shown in FIG. 12B, mesh-shaped air vents 20a are formed at the part of the case 20 corresponding to the placement of the fuel cell 12. A filter is placed on the air vents 20a that keep air permeability and prevents or limits entry of dusts contained in air.

Figure 12C:
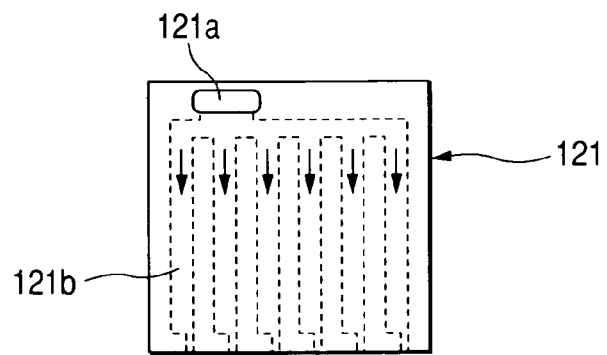

As shown in FIG. 12C, a manifold 121a is formed in the separator 121 at the anode electrode side in the fuel cell 12. The manifold 121a is penetrated vertically through the separator 121. A plurality of grooves 121b branched from the manifold 121a are formed on the plate of the separator 121.

The fuel stored in the fuel storage unit 11 is supplied to the fuel cell 12 through the valve 14. The supplied fuel is supplied through the manifold 121a to each fuel cell, and further supplied through a plurality of the grooves 121b formed in the separator 121 to the entire surface of the MEA 120.

The electrical chemical reaction occurs in the MEA 120 using the supplied fuel and air as oxidizing agent supplied to the cathode side separator 122. Electrical energy is thereby generated.

As described above, according to the secondary battery charging system of the eighth embodiment, the fuel cell unit 10 formed with a single body can reduce the entire size of the secondary battery charging system. Further, this can allow an easy replacement of the fuel cell unit 10.

Ninth Embodiment

A description will now be given of the secondary battery charging system according to the ninth embodiment with reference to FIG. 13.

When compared with the secondary battery charging system of the first embodiment, the ninth embodiment has a different feature to generate a fuel, to be consumed in the fuel cell, by a residual electrical power.

Other components of the secondary battery charging system of the ninth embodiment are the same of those of the first embodiment. Therefore the explanation for those is omitted here.

Figure 13:
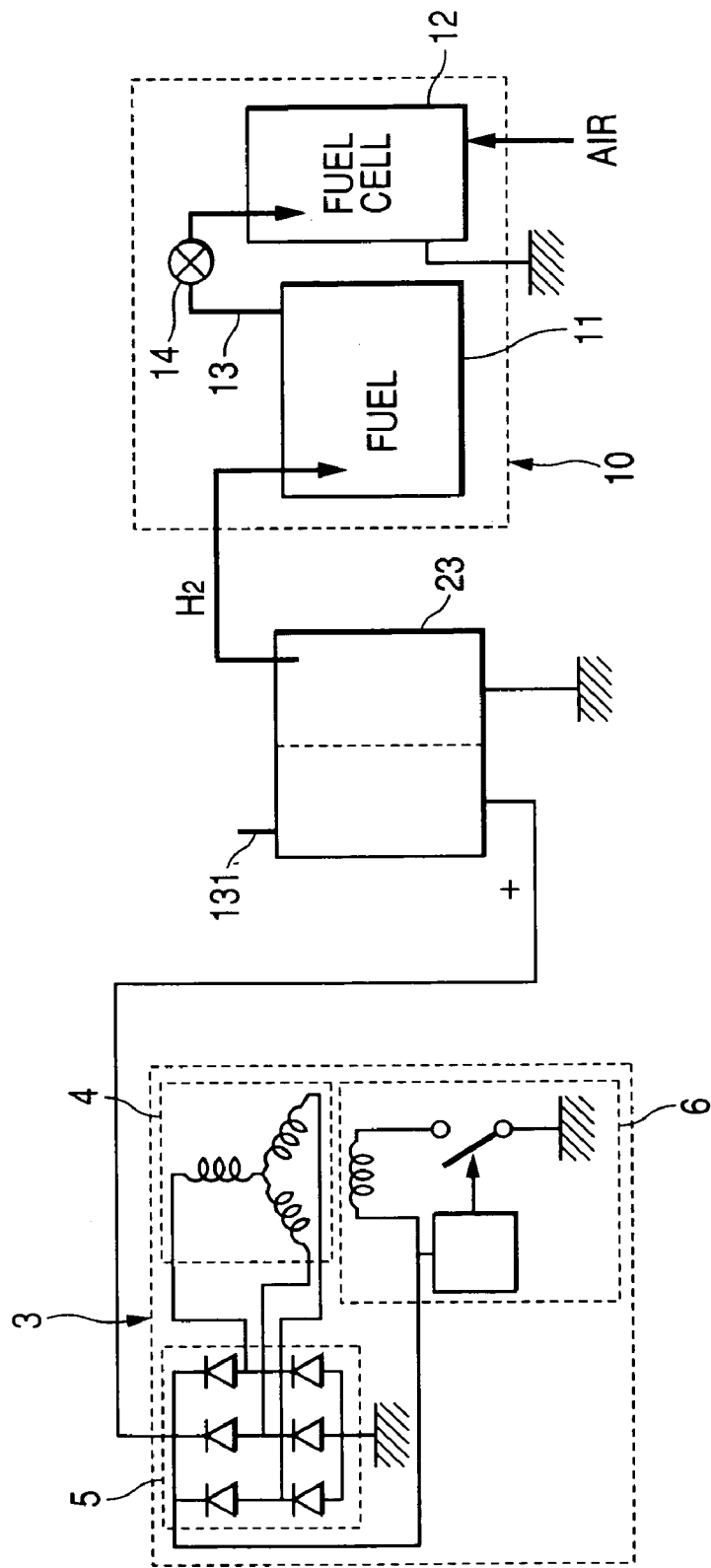
FIG. 13 is a schematic diagram showing an entire configuration of a secondary battery charging system of a ninth embodiment according to the present invention.

FIG. 13 is a schematic diagram showing an entire configuration of the secondary battery charging system of the ninth embodiment. As shown in FIG. 13, an electrolyzer 23 for performing electrolysis is installed in the secondary battery charging system.

Water is supplied from a water storage unit (omitted from FIG. 13) to the electrolyzer 23 through a water inlet pile 123, for example. The water obtained during the generation of the electrical power is used in the electrolysis, or the condensed water generated from an air conditioner (not shown) installed in a vehicle is used in the electrolysis.

When receiving the voltage generated by the alternator 4 during the operation of the internal combustion engine (not shown) and then rectified by the rectifier 5, the electrolyzer 23 performs the electrolysis in order to generate hydrogen. The hydrogen generated by the electrolyzer 23 is supplied to and stored in the fuel storage unit 11. A high-pressure hydrogen tank or a hydrogen tank for storing hydrogen gas is used for the high pressure hydrogen tank.

The hydrogen stored in the fuel storage tank 11 is supplied to the fuel cell 12 by opening the valve 14 according to demand during the stop of the internal combustion engine. The fuel cell 12 generated the electrical energy using the hydrogen received.

As described above, the configuration to generate the fuel to be supplied to the fuel cell 12 allows elimination of any additional fuel.

Further, it is possible to have a configuration to mount an additional generator such as a dynamo to generate electrical energy by using regenerative energy generated during deceleration of a vehicle. The electrical energy generated by the dynamo is supplied to the alternator 4. Thus, the electrical energy generated by the alternator 4 and the dynamo can be supplied to the electrolyzer 23 for performing the electrolysis in order to generate hydrogen. This configuration allows to generate a lot of water.

Other Preferred Modifications

As set forth in detail, according to the first to ninth embodiments, the electrical energy generated by the fuel cell 12 is supplied to the secondary battery 1 for charging. The present invention is not limited by this configuration. For example, it is possible to directly supply to the electrical load 2 the electrical energy generated in the fuel cell 12. This configuration is required to install between the fuel cell 12 and the electrical load 2 the voltage conversion circuit 17 for boosting the electrical energy generated by the fuel cell 12.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A secondary battery charging system mounted on a vehicle comprising:
    a secondary battery configured to supply an electrical energy for use in start-up of an internal combustion engine as a driving power source of the vehicle;
    an electrical load configured to receive the electrical energy from the secondary battery during the stop of the internal combustion engine;
    a fuel cell configured to generate the electrical energy in an electrochemical reaction of combining a hydrogen and oxygen, and to supply the generated electrical energy to the secondary battery;
    a fuel storage unit configured to store the fuel to be consumed for the electrochemical reaction in the fuel cell; and
    a fuel supply controller that is configured to:
        (i) control the supply of fuel from the fuel storage unit to the fuel cell in order to generate electrical energy in the fuel cell,
        (ii) judge whether or not a predetermined period of time has elapsed, where the predetermined period of time is counted from when operation of the internal combustion engine stops, and
        (iii) instruct the fuel cell to initiate the generation of electrical energy, and provide the generated electrical energy to the secondary battery when the fuel supply controller determines that the predetermined period of time has elapsed.

2. The secondary battery charging system according to claim 1, wherein on judging that the internal combustion engine stops, the fuel supply controller instructs the fuel cell to initiate the generation of electrical energy and to provide the generated electrical energy to the secondary battery.

3. The secondary battery charging system according to claim 1, wherein the fuel stored in the fuel storage unit is a liquid organic compound.

4. The secondary battery charging system according to claim 3, wherein the fuel is a windshield washer liquid containing the liquid organic compound.

5. The secondary battery charging system according to claim 4, wherein the fuel storage unit comprises a membrane unit configured to extract only methanol component or a combination of methanol and water components from the windshield washer liquid.

6. The secondary battery charging system according to claim 3, further comprises a valve placed on a fuel passage between the fuel storage unit and the fuel cell, and the valve is configured to open and close the fuel passage under the control of the fuel supply controller.

7. The secondary battery charging system according to claim 6, wherein the valve is configured to open one time.

8. The secondary battery charging system according to claim 7, wherein the valve comprises:
    an interrupting member configured to interrupt the supply of the fuel between the fuel storage unit and the fuel cell;
    a needle that is shiftable in the valve so as to break the interrupting member under the control of the fuel supply controller;
    a wire configured to fix the needle at a given position in the valve where the tip of the needle is not contacted with the interrupting member, and to release the needle from the fixed position by melting the wire by heating of electric power; and
    an elastic member configured to push forcedly a tip of the needle to the interrupting member in order to break the interrupting member when the wire is melt.

9. The secondary battery charging system according to claim 6, wherein the valve is configured to open and close repeatedly.

10. The secondary battery charging system according to claim 9, wherein the valve comprises:
    a pedestal having a penetrate hole through which the fuel flows from the fuel storage unit to the fuel cell;
    a shiftable needle that moves repeatedly in forward and backward directions in the valve so as to open and close the penetrate hole under the control of the fuel supply controller;
    a coil spring by which the needle is forcedly pushed to the penetrate hole of the pedestal so that the fuel from the fuel storage unit is sealed from the fuel cell; and
    a solenoid by which the needle is forcedly shifted away from the penetrate hole of the pedestal under the control of the fuel supply controller.

11. The secondary battery charging system according to claim 1, wherein the fuel storage unit and the fuel cell are integrated with a single body.

12. The secondary battery charging system according to claim 1, wherein the fuel storage unit supplies one time the fuel to the fuel cell.

13. The secondary battery charging system according to claim 1, wherein the fuel supply controller operates based on the electric energy supplied from the secondary battery.

14. The secondary battery charging system according to claim 1, wherein the fuel cell comprises a plurality of fuel cell elements electrically connected in series.

15. The secondary battery charging system according to claim 1, further comprises voltage conversion means installed between the fuel cell and the secondary battery and configured to boost to a given voltage level a voltage generated in the fuel cell.

16. The secondary battery charging system according to claim 15, wherein the voltage conversion means comprises a plurality of boosters.

17. The secondary battery charging system according to claim 15, wherein the voltage conversion means operates based on the electric energy supplied from the secondary battery.

18. The secondary battery charging system according to claim 1, further comprises:
    fuel residual detection means configured to detect empty fuel in the fuel storage unit; and
    information means configured to inform the state of the empty fuel in the fuel storage unit when the fuel residual detection means detects the empty fuel in the fuel storage unit.

19. The secondary battery charging system according to claim 1, wherein
    the fuel supply controller comprising a first communication means configured to communicate with an external device that is located in the outside of the vehicle, and through the first communication means the fuel supply controller informs the information regarding amount of a residual fuel in the fuel storage unit, the external device comprises:
        a second communication means capable of communicating with the fuel supply controller
        information means configures to inform to a user the information regarding the amount of the residual fuel in the fuel storage unit; and
        operation means configured to input an instruction by the user regarding initiation of the charging to the secondary battery, wherein the external device transmits to the fuel supply controller through the second communication means the instruction regarding the start to charge the secondary battery,
    wherein on receiving the instruction regarding the start to charge the secondary battery, the fuel supply controller instructs the fuel cell to initiate the generation of electrical energy and
        to provide the generated electrical energy to the secondary battery.

* * * * *